(12) United States Patent
Ferré Rangel et al.

(10) Patent No.: US 8,869,998 B2
(45) Date of Patent: Oct. 28, 2014

(54) EQUIPMENT SUPPORT SYSTEM FOR VESSELS

(76) Inventors: Antonio Luis Ferré Rangel, Guaynabo, PR (US); William Couvertier Vázquez, Fajardo, PR (US)

(*) Notice: Subject to any disclaimer, the term of this patent is extended or adjusted under 35 U.S.C. 154(b) by 56 days.

(21) Appl. No.: 13/552,841

(22) Filed: Jul. 19, 2012

(65) Prior Publication Data
US 2014/0021155 A1    Jan. 23, 2014

(51) Int. Cl.
| | | |
|---|---|---|
| *A47F 7/00* | (2006.01) | |
| *A47F 5/00* | (2006.01) | |
| *A47F 5/08* | (2006.01) | |
| *A47B 81/00* | (2006.01) | |
| *B63B 35/79* | (2006.01) | |
| *A63C 11/02* | (2006.01) | |
| *A47F 5/01* | (2006.01) | |
| *A63B 71/00* | (2006.01) | |
| *B60R 9/08* | (2006.01) | |

(52) U.S. Cl.
CPC ............. *A47B 81/00* (2013.01); *B63B 35/7946* (2013.01); *A63C 11/028* (2013.01); *A47F 5/01* (2013.01); *A63B 71/0036* (2013.01); *B60R 9/08* (2013.01)
USPC ........................ 211/85.7; 211/70.5; 211/106.1

(58) Field of Classification Search
CPC ...... A47B 81/00; A47B 81/005; A47B 55/02; A63C 11/02; A63C 11/028; A47F 7/0028; A47F 7/00035; A47F 7/0021; A47F 5/0876; A47F 5/08; A47F 5/006; A47F 5/01; A47F 5/14; A63B 71/0036; B60R 9/00; B60R 9/908; B60R 9/12; B60R 7/08; B60R 7/14; B60R 7/00; A47G 25/06; A47G 25/0614; A47G 25/0621; A47G 29/00; E06C 7/14; F16M 13/02; F16M 13/00; B63B 35/79; B63B 35/7946; B63B 35/81; B63B 35/85
USPC ............... 211/182, 85.7, 70.5, 106.01, 86.01, 211/87.01, 106, 181.1, 66, 70.6; 248/682, 248/690, 692, 309.1, 339, 303, 304; 224/406, 408, 401, 428–431, 441, 442, 224/458, 567, 482
See application file for complete search history.

(56) References Cited

U.S. PATENT DOCUMENTS

| | | | | |
|---|---|---|---|---|
| 177,936 | A * | 5/1876 | Haines | 211/106.01 |
| 335,189 | A * | 2/1886 | Gray | 211/106.01 |
| 1,111,304 | A * | 9/1914 | Forester | 211/106.01 |
| 2,778,588 | A * | 1/1957 | Bruno | 248/112 |
| 3,516,634 | A * | 6/1970 | Schafernak et al. | 248/220.22 |
| 3,722,652 | A * | 3/1973 | Busch et al. | 194/256 |
| 3,789,778 | A * | 2/1974 | Brand | 108/94 |
| 4,367,819 | A * | 1/1983 | Lewis | 211/59.1 |
| 4,372,450 | A * | 2/1983 | Licari et al. | 211/106.01 |
| 4,747,529 | A * | 5/1988 | Hinderaker et al. | 224/325 |
| 5,069,350 | A * | 12/1991 | Wolff et al. | 211/106.01 |
| 5,078,279 | A * | 1/1992 | Hancock et al. | 211/64 |

(Continued)

*Primary Examiner* — Jennifer E Novosad
(74) *Attorney, Agent, or Firm* — Ferraiuoli LLC; Eugenio J. Torres-Oyola; Rafael Rodrígues-Muriel

(57) ABSTRACT

The present Disclosure is an apparatus for holding sporting equipment. The apparatus includes a pair of U-shaped tubular arms spaced apart from one another and in a generally equivalent horizontal position. The apparatus comprising an elongated part configured to fit inside a fishing rod holder. At least two lateral supports opposing parallel members and an extendable middle section, in combination, support the sporting equipment thereon.

7 Claims, 4 Drawing Sheets

(56) References Cited

U.S. PATENT DOCUMENTS

| | | | | |
|---|---|---|---|---|
| 5,305,936 A | * | 4/1994 | Nusbaum | 224/324 |
| 5,307,944 A | * | 5/1994 | Reedy | 211/70.5 |
| 5,316,155 A | * | 5/1994 | Collins et al. | 211/70.5 |
| 5,335,794 A | * | 8/1994 | Reedy | 211/85.7 |
| 5,477,968 A | * | 12/1995 | Largent et al. | 211/60.1 |
| 5,934,488 A | * | 8/1999 | Grimshaw | 211/70.5 |
| 6,375,141 B1 | * | 4/2002 | Kettlestrings | 248/303 |
| 7,249,679 B2 | * | 7/2007 | Klein | 211/37 |
| 7,284,671 B1 | * | 10/2007 | Doscher | 211/59.1 |
| 8,042,229 B2 | * | 10/2011 | Wang | 16/270 |
| 8,286,928 B2 | * | 10/2012 | Lien | 248/303 |
| 8,430,253 B1 | * | 4/2013 | Jackson et al. | 211/90.03 |
| 2006/0243687 A1 | * | 11/2006 | Hilger et al. | 211/70.6 |
| 2007/0235400 A1 | * | 10/2007 | Wald | 211/85.7 |
| 2007/0251904 A1 | * | 11/2007 | Winig et al. | 211/106.01 |
| 2010/0096347 A1 | * | 4/2010 | Theobald et al. | 211/85.7 |

* cited by examiner

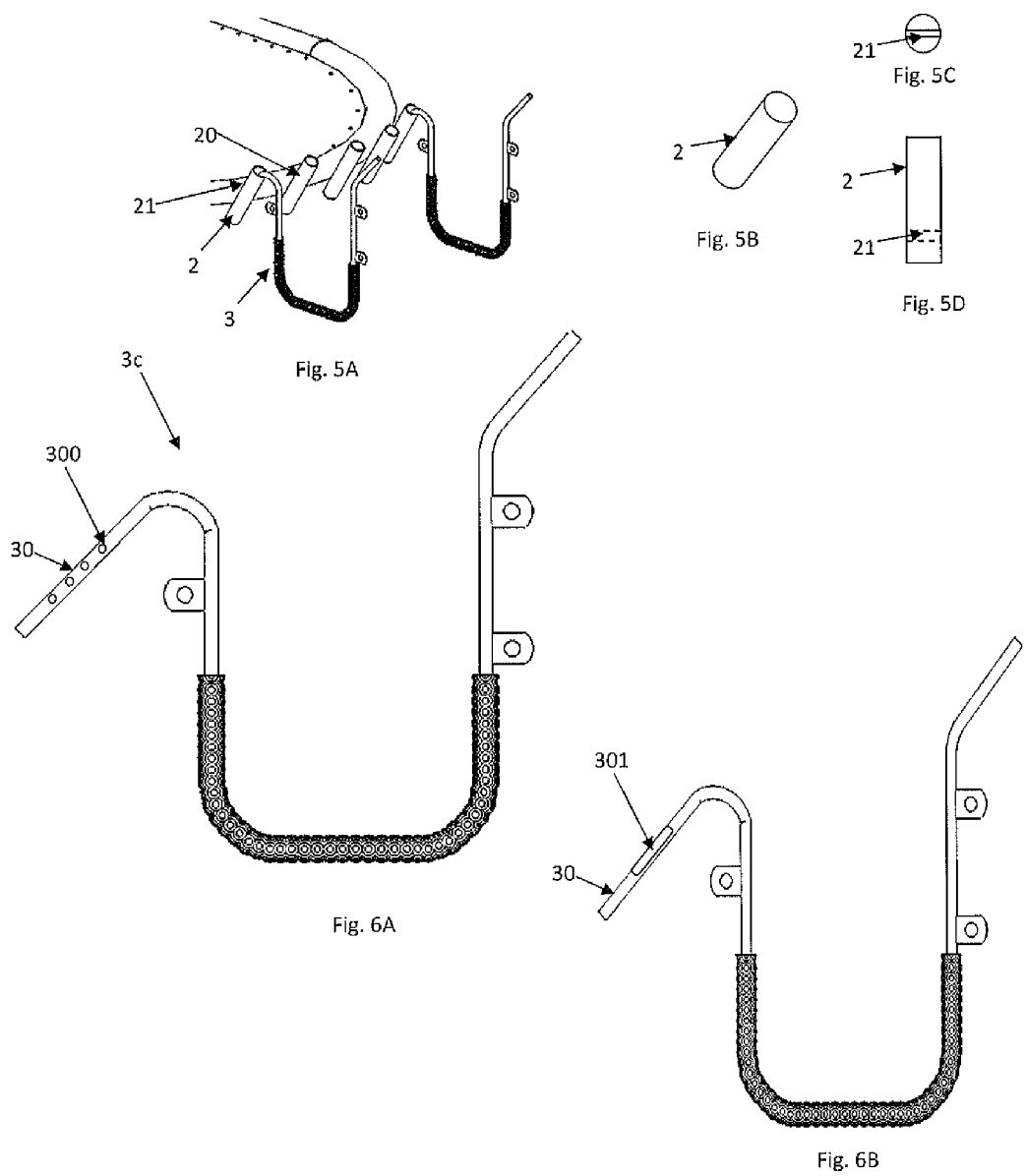

EQUIPMENT SUPPORT SYSTEM FOR VESSELS

STATEMENT REGARDING FEDERALLY SPONSORED RESEARCH AND DEVELOPMENT

N/A

RELATED APPLICATIONS

N/A

BACKGROUND OF THE DISCLOSURE

1. Field of the Disclosure

This disclosure relates generally to a support system and more particularly to an adjustable device or rack-mountable system for boat rods holders which holds and support sporting equipment, such as surfboard, paddleboards and articles associated therewith.

2. Discussion of the Background

Vessels are used as transportation devices to provide passage across the water. Different types and shapes of vessels are well known. On small vessels the space to carry several articles is limited therefore carrying big objects, such as sporting equipment, is hazardous. Some vessels are equipped with fishing rod holders' holes which are known in the art for holding fishing rods. Despite the availability and use of these fishing rod holders' holes to insert fishing rods, there remains a need for providing space to carry sporting equipment which can be mounted on or removed from the vessel in a simple and easy manner.

Therefore, there is a need to provide an apparatus and method for supporting equipment on a vessel, such as surfboard, paddleboards and articles associated therewith which overcomes the disadvantages and shortcomings of the prior art.

SUMMARY OF THE DISCLOSURE

The present disclosure overcomes the limitations of the previous vessels in order to provide more space to carry several objects, more particularly sporting equipment and accordingly with principles of the present Disclosure an apparatus easy to install and remove comprising a pair of U-shaped tubular arms spaced apart from one another and in a generally equivalent horizontal position.

The first exemplary embodiment in accordance with the principles of the present Disclosure discloses each tubular arm comprising an elongated part, a middle section, a first lateral support and a second lateral support. The first lateral support comprises a first distal end and first proximal end. The second lateral support comprises a second distal end and second proximal end. The middle section comprises a middle elongated body connected to said first distal end and said second distal end on opposite sides. Further, the elongated part is angularly attached to said first proximal end.

It is another object of the present disclosure to provide an elongated part configured to fit inside a fishing rod holder.

In accordance with the principles of the present disclosure the tubular arm comprises an elongated part that is attached to the first proximal end and configured to be inserted inside a hollow fishing rod holder's hole. The diameter of the elongated part is smaller than the diameter of the holder. The elongated part is slide in for attachment and is easily pulled out for removing it.

Another object of the present disclosure is to provide attaching means extended from the first lateral support and the second lateral support and configured to assist the support of the sporting equipment.

In accordance with the principles of the present disclosure the tubular arm comprises the first lateral support and the second lateral support separated by the middle section, wherein said first lateral support and the second lateral support rests on top of the middle section while the first lateral support and the second lateral support contain the side to side displacement of the sport equipment.

Another object of the present disclosure is to provide an elongated part with at least a recess to be aligned with a holder's recess which assists in combination with a pass-through rod, the process of fixing the tubular arm in the fishing rod holder's hole.

Yet another object of the present disclosure is to provide an expandable middle section which expands the distance between the first lateral support and the second lateral support in order to provide more space for the sporting equipment.

The Disclosure itself, both as to its configuration and its mode of operation will be best understood, and additional objects and advantages thereof will become apparent, by the following detailed description of a preferred embodiment taken in conjunction with the accompanying drawings.

The Applicant hereby asserts, that the disclosure of the present application may include more than one Disclosure, and, in the event that there is more than one Disclosure, that these Disclosures may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the disclosure of the application, which is measured by the claims, nor is it intended to be limiting as to the scope of the disclosure in any way.

BRIEF DESCRIPTION OF THE DRAWINGS

The accompanying drawings, which are incorporated herein, constitute part of the specifications and illustrate the preferred embodiment of the disclosure.

FIG. 5A-5D shows details of the fishing rod holder in accordance with the principles of the present disclosure.

FIG. 6A-6B shows more details of the third exemplary embodiment of the tubular arm embodiment in accordance with the principles of the present disclosure.

DESCRIPTION OF THE PREFERRED EMBODIMENT

Figure 1:
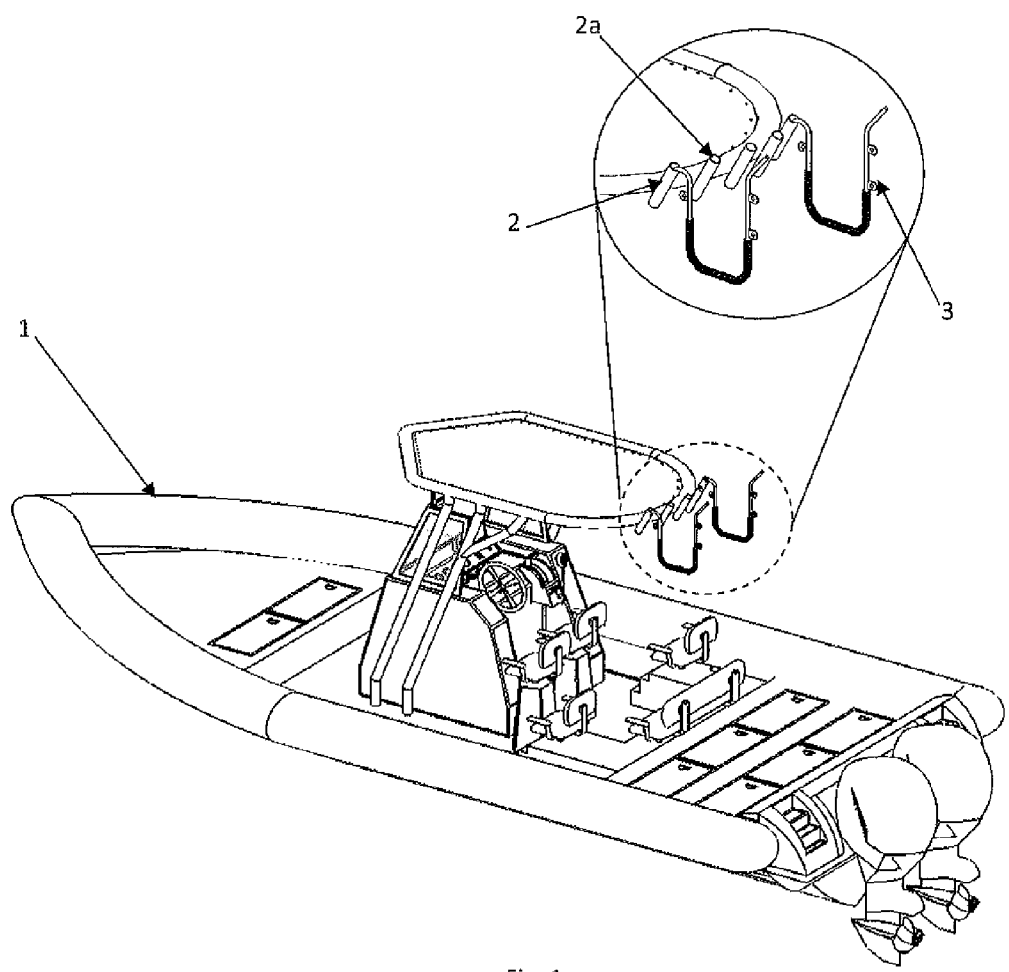
FIG. 1 shows a first general structure of the present disclosure in accordance with the principles of the present Disclosure.

Referring to FIG. 1, it shows a first exemplary general structure embodiment in accordance with the principles of the present Disclosure. A vessel 1 comprising a fishing rod holder 2 having a holder's hole 2a serving as an entrance for the holder hollow body for receiving the tubular arm 3. At least a pair of tubular arms is used, wherein said pair of U-shaped tubular arms 3 are spaced apart from one another in a generally equivalent horizontal position.

Figure 2:
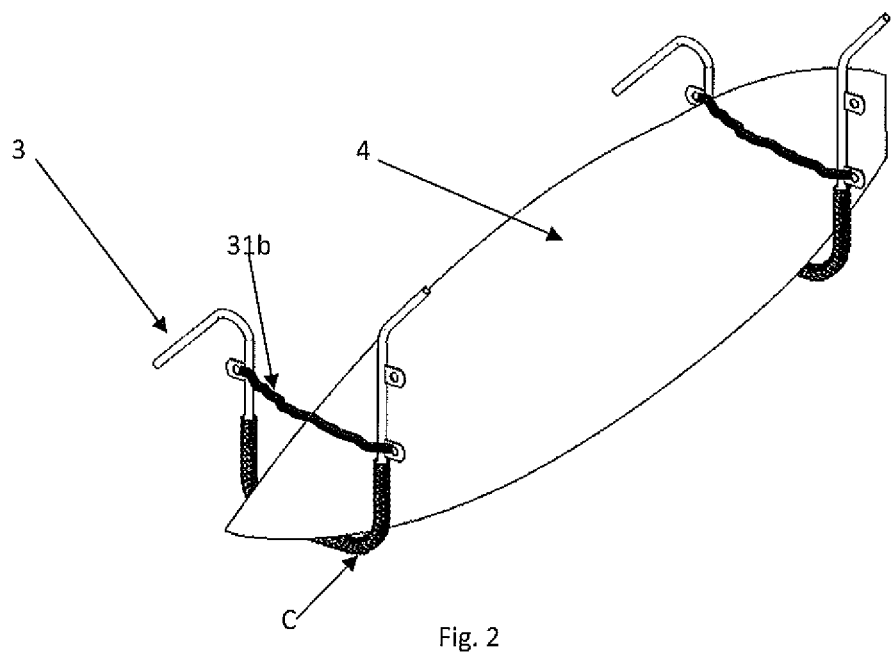
FIG. 2 shows the general structure of the present Disclosure supporting sporting equipment in accordance with the principles of the present disclosure.

The distance between tubular arms 3 depends on the distance between the fishing rod holders 2. FIG. 2 discloses the sporting equipment 4, such as a surfing board, positioned between the tubular arms 3. The tubular arm's 3 cover C is made of plastic, rubber or any elastic material capable of avoiding damage to the sport equipment 4 while it is supported by the tubular arm 3. As shown, the tubular arm 3 surrounds most of the sporting equipment 4 and the portion not covered by the tubular arm 3 serves as the entrance to place the sport equipment 4 between the tubular arm 3 structure. A cable 31b is used to limit the displacement of the sporting equipment 4 while it is placed on tubular arm 3 structure.

Figure 3A:
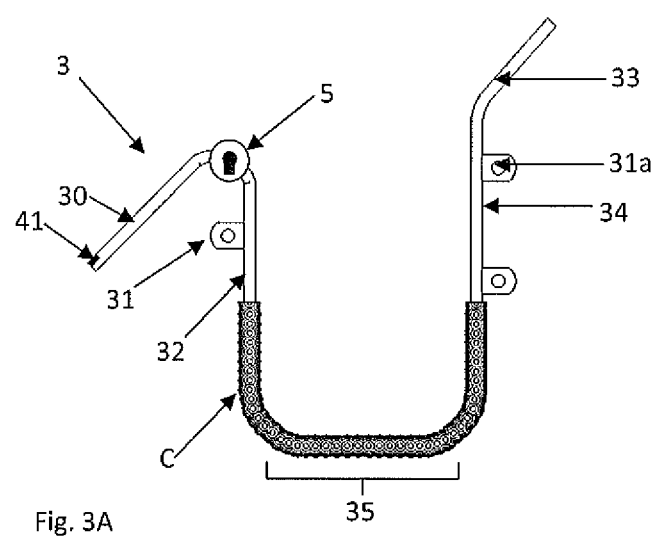
FIG. 3A-3C shows detailed views of the tubular arm structure of the first exemplary embodiment in accordance with the principles of the present disclosure.
Figure 3B:
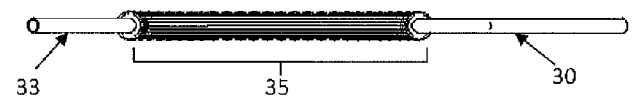
Figure 3C:
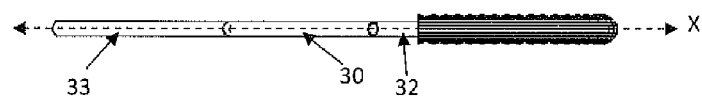

The tubular arm 3, as shown in FIGS. 3A-3C, comprises an elongated part 30, a middle section 35, a first lateral support 32 and a second lateral support 34. The first lateral support comprises a first distal end 32a and first proximal end 32b shown in more details below. The second lateral support comprises a second distal end 34a and second proximal end 34b shown in more details below. The middle section 35 comprises a middle elongated body connected said first distal end 32a and said second distal end 34b. In the present first embodiment the first distal end 32a, the second distal end 34b and the middle section 35 are mechanically coupled. The mechanical coupling can be accomplished by making, connecting or bonding the parts together. For example, the parts are mechanically coupled if the parts are integrally made or connected by other means such as screws, bonding compounds and others. In the instance for the first exemplary embodiment the first distal end 32a, the second distal end 34b and the middle section 35 are made integrally. Further, the elongated section 30 is angular or inclined with respect to said first proximal end 32b. It has to be understood that the purpose of the elongated part 30 is to fix the tubular arm 3 in the holder's hole 2a.

The inclination or angle desired depends on the fishing holder holes. Basically, the elongated part 30 having a recess 41 serves as a hook for the tubular arm 3. The elongated part 30 serving as a hook is configured to fit inside the holder's hole 2a. As an alternative, the elongated part 30 can be adjusted by adding adjustable means 5 between the elongated part 30 and the first proximal end 32b. For example, an adjustable means 5 may comprise a ratchet mechanism, such as disclosed in U.S. Pat. No. 4,328,720, herein included by reference, for providing a preferably angle for the elongated part 30. The racket mechanism avoids unwanted movement of the elongated part 30 in a particular direction and can be re-adjusted by just changing the direction. Other adjustable means can be used for adjusting the angle of the elongated part 30 with respect to the first lateral support 32.

Further, the first lateral support 32 and the second lateral support 34 comprises protrusions 31. The protrusions 31 serve to avoid unwanted displacement of the sporting equipment 4. The protrusion 31 comprises protrusion's holes 31a wherein an elastic cable 31b can pass through or is held in position by using the protrusion's holes 31a.

Further, as clearly shown in FIG. 3B, the middle section 35 separates the first lateral support 32 and second lateral support 34. Further, FIG. 3C is a side view of the tubular arm 3 which clearly shows the second support comprising an extension member 33 extending from the second proximal end 34b and away or different direction from the elongated part 30. The extension member 33 assists with the process of sliding the sporting equipment 4 inside the tubular arm 3. In addition, the inclination of the elongated part 30 and/or the extension member 33 are parallel to the same axis of the first lateral support 32 and second lateral support 34.

Figure 4B:
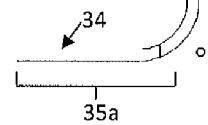
FIG. 4A-4C shows a second exemplary embodiment of the tubular arm embodiment in accordance with the principles of the present disclosure.
Figure 4A:
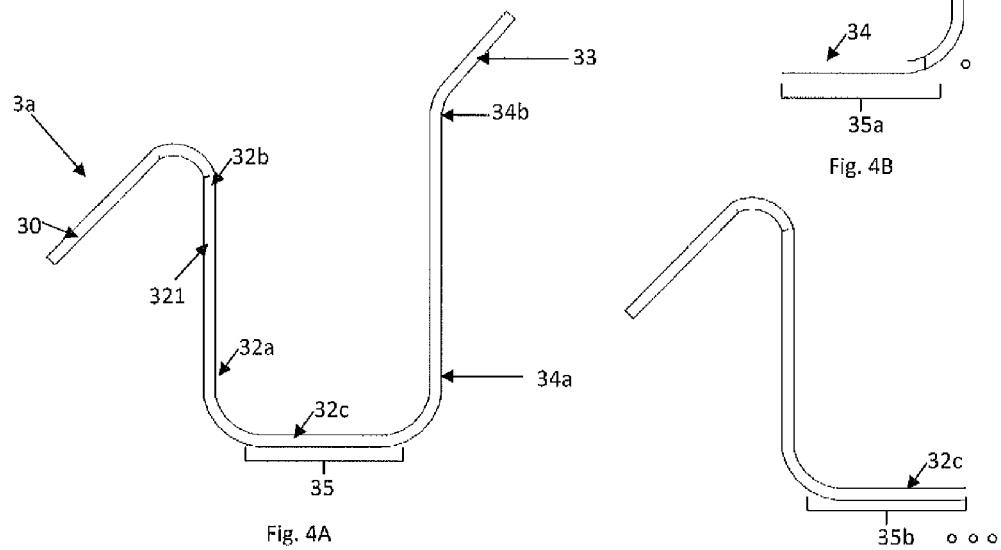
Figure 4C:
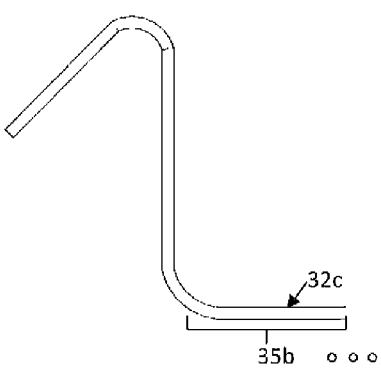

FIG. 4A through FIG. 4C shows the second exemplary embodiment in accordance with the principles of the present disclosure. As mentioned before the tubular arm 3a comprises an elongated part 30, a middle section 35, a first lateral support 32 and a second lateral support 34. FIG. 4A clearly shows the first distal end 32a, first proximal end 32b, the second distal end 34a and second proximal end 34b. The main difference between the first exemplary embodiment and the second exemplary embodiment is that the middle section 35 is adjustable. The middle section 35 comprises a first middle section 35b connected to the first distal end 32a and a second middle section 35a connected to the second distal end 34a. The second middle section 35a comprises a diameter smaller than the first middle section 35b, therefore the second middle section 35a can be slide inside first middle section 35b. Further, in order to fix or avoid unwanted displacement between the middle section 35b and said second middle section 35a, the first middle section 35b comprises recesses 32c that in combination with a piston mechanism 34c holds the two pieces together. The piston 34c is pressed and then released inside the recess 32c selected by user. Basically, once a particular length is decided the middle section 35 is adjusted by selecting the recess 32c that in combination with the placement of the piston mechanism 34c inside the recess 32c meets the requirements of the desired length. The number of recesses 32c may vary and depends on the manufacturer's construction or specifications. Further is important to understand that the farther the second lateral support 34 is from the first lateral support the less weight the tubular arm 3 can withstand.

FIG. 5A through FIG. 6B are directed to the third exemplary embodiment in accordance with the principles of the present Disclosure. As mentioned before the tubular arm 3c comprises elongated part 30, a middle section 35, a first lateral support 32 and a second lateral support 34. The main difference between the other exemplary embodiments and the third exemplary embodiment is that the elongated part 30 comprises attaching means.

As shown in FIG. 5A through 5D the fishing holder rod 2 comprises a holder recess 20. The fishing holder 2, as shown in FIG. 5B through FIG. 5D, comprises a cylindrical configuration with a rod 21 extended across the inner walls of the main body. Further, the elongated part 30 is inserted inside the holder's hole 2a as disclosed before. While the elongated part 30 is positioned inside the fishing holder 2 the rod 21 is configured to fit inside the recess 41 in order to avoid unwanted rotational movement of the tubular arm 3. The elongated part 30, as mentioned, also comprises recesses 300. During the installation process of the tubular arm 3c the elongated part 30 with at least a recess 300 is aligned with the holder's recess 20 which assists, in combination with a pass-through rod 21, the process of fixing the tubular arm 3c in the fishing rod holder's hole 2a.

The elongated part, as mentioned, comprises at least a recess 300, 301 as shown in FIG. 7A and FIG. 7B. The dimension of the recess 300, 301 depends on the manufacturer or user specifications. The material selected for the construction of the tubular arm 3 may vary. However, the selection of a strong material which is not easy to bend and can withstand different environments is preferable. For example, the use of strong plastic or metals can be used.

The disclosure is not limited to the precise configuration described above. While the disclosure has been described as having a preferred design, it is understood that many changes, modifications, variations and other uses and applications of the subject Disclosure will, however, become apparent to those skilled in the art without materially departing from the novel teachings and advantages of this disclosure after considering this specification together with the accompanying drawings. Accordingly, all such changes, modifications, variations and other uses and applications which do not depart from the spirit and scope of the Disclosure are deemed to be covered by this disclosure as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present Disclosure, as well as equivalents thereof. The details in the patents, patent applications, and publications incorporated by reference herein may be considered to be incorporable at applicant's option, into the claims during prosecution as further limitations in the claims to patently distinguish any amended claims from any applied prior art.

We claim:

1. A sporting equipment support apparatus comprising:
   at least a pair of rod holders spaced apart, wherein each rod holder comprises a hollow holder body;
   at least a pair of tubular arms spaced apart from one another, wherein each tubular arm comprises,
   an elongated part;
   a middle section, wherein said middle section comprises a middle elongated body, wherein said middle elongated body comprise a first end and a second end;
   a first lateral support comprising a first distal end and first proximal end;
   and a second lateral support comprising a second distal end and second proximal end;
   wherein said middle elongated body is positioned between said first distal end and said second distal end, wherein said first lateral support is parallel to said second lateral support, wherein said first end is mechanically coupled to said first distal end, wherein said second end is mechanically coupled to said second distal end, wherein said middle elongated body is configured to provide a first distance between the first lateral support and said second lateral support; and
   wherein said elongated part is mechanically coupled to the first proximal end, wherein said elongated part extends away from the second lateral support, wherein each elongated part is configured to be positioned inside said holder hollow body and wherein said elongated part extends towards the middle elongated body and away from the first lateral support.

2. The sporting equipment support apparatus as in claim 1, wherein each tubular arm comprises an extension member.

3. The sporting equipment support apparatus as in claim 1, wherein the elongated part is configured to be inclined by an adjustable means for adjusting the angle of the elongated part with respect to the first lateral support and wherein said adjustable means id mechanically coupled to the first proximal end and said elongated part.

4. The sporting equipment support apparatus as in claim 1, wherein each tubular arm comprises protrusions, and wherein said protrusion comprises protrusion holes.

5. The sporting equipment support apparatus as in claim 1, wherein the elongated part comprises recesses.

6. The sporting equipment support apparatus as in claim 1, wherein the middle section comprises a first middle section mechanically coupled to the first distal end and a separated second middle section mechanically coupled to the second distal end.

7. The sporting equipment support apparatus as in claim 1, wherein each tubular arm comprises a cover.

* * * * *